US012718004B2

(12) United States Patent
Sultanum et al.

(10) Patent No.: US 12,718,004 B2
(45) Date of Patent: Aug. 25, 2026

(54) AUTHORING DATA STORIES WITH GENERATIVE AI

(71) Applicant: Salesforce, Inc., San Francisco, CA (US)

(72) Inventors: Nicole Barbosa Sultanum, Seattle, WA (US); Arjun Srinivasan, Seattle, WA (US)

(73) Assignee: Salesforce, Inc., San Francisco, CA (US)

(*) Notice: Subject to any disclaimer, the term of this patent is extended or adjusted under 35 U.S.C. 154(b) by 221 days.

(21) Appl. No.: 18/419,460

(22) Filed: Jan. 22, 2024

(65) Prior Publication Data

US 2024/0362405 A1 Oct. 31, 2024

Related U.S. Application Data

(60) Provisional application No. 63/463,046, filed on Apr. 30, 2023.

(51) Int. Cl.

| | |
|---|---|
| ***G06F 40/00*** | (2020.01) |
| ***G06F 40/137*** | (2020.01) |
| ***G06F 40/166*** | (2020.01) |

(52) U.S. Cl.
CPC .......... *G06F 40/166* (2020.01); *G06F 40/137* (2020.01)

(58) Field of Classification Search
CPC ............................ G06F 40/166; G06F 40/137
See application file for complete search history.

(56) References Cited

U.S. PATENT DOCUMENTS

| | | | | |
|---|---|---|---|---|
| 11,769,017 | B1 * | 9/2023 | Gray | G06F 40/56 704/9 |
| 2023/0394855 | A1 * | 12/2023 | Xie | G06F 40/40 |
| 2024/0256757 | A1 * | 8/2024 | Manavoglu | G06F 16/954 |
| 2024/0303263 | A1 * | 9/2024 | Ojha | G06F 16/383 |
| 2024/0303424 | A1 * | 9/2024 | Reddy | G06F 40/40 |
| 2024/0303441 | A1 * | 9/2024 | Sobhy Deraz | G06T 11/206 |

* cited by examiner

*Primary Examiner* — Wilson W Tsui
*Assistant Examiner* — David Faber
(74) *Attorney, Agent, or Firm* — Morgan, Lewis & Bockius LLP

(57) ABSTRACT

A computing device receives user interaction with a portion of a data visualization that is displayed on the computing device. In response to receiving the user interaction, the computing device generates a first prompt that includes parameters specifying a visualization type of the data visualization, a data array corresponding to data marks of the data visualization, and a title of the data visualization. The computing device inputs the first prompt into a large language model (LLM), and obtains from the LLM a text narrative for the portion of the data visualization. The device generates a second prompt in accordance with the text narrative, inputs the second prompt into the LLM, and obtains from the LLM a title for the text narrative. The device generates a self-contained story comprising the text narrative and the title.

20 Claims, 15 Drawing Sheets

Chart Annotations

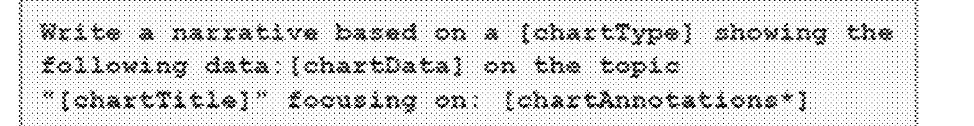

```
Write a narrative based on a [chartType] showing the
following data:[chartData] on the topic
"[chartTitle]" focusing on: [chartAnnotations*]
```

Mark Selection

```
...focusing on:
(1) {Love it: 39},{Month: June}
(2) {Love it: 40},{Month: December}
(3) {Hate it: 13},{Month: January}
(4) {Hate it: 10},{Month: February}
```

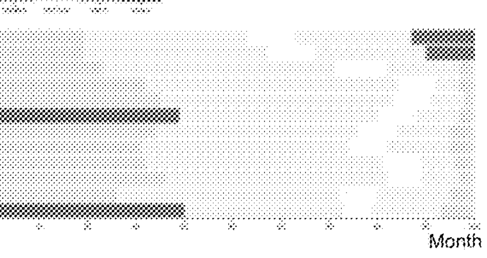

Axis Range Selection

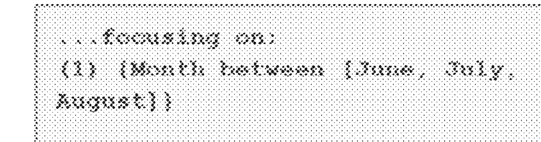

```
...focusing on:
(1) {Month between [June, July,
August]}
```

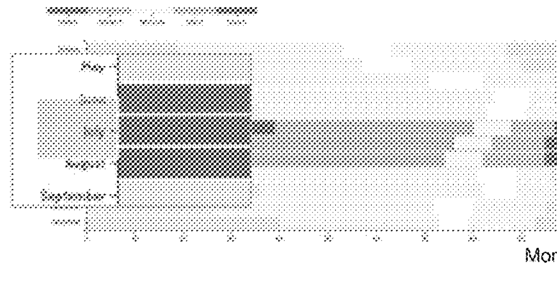

Color Legend Range Selection

```
...focusing on:
(1) {category : Like it}
```

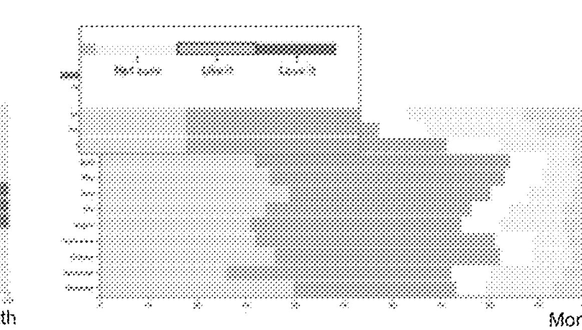

702 A method is performed at a computing device having a display, one or more processors, and memory.

704 The memory stores one or more programs configured for execution by the one or more processors.

706 Receive a first user interaction with one or more portions of a data visualization that is displayed on the computing device.

708 The first user interaction includes one or more user-specified annotations on the data visualization.

710 In response to receiving the first user interaction, generate a first prompt that includes a first plurality of parameters. The first plurality of parameters includes a first parameter specifying a visualization type of the displayed data visualization, a second parameter specifying a data array corresponding to data marks of the displayed data visualization, and a third parameter specifying a title of the displayed data visualization.

712 The first plurality of parameters includes a fourth parameter specifying the one or more user-specified annotations.

Figure 7A

714 Input the first prompt into a large language model (LLM) and obtain, from the LLM, a text narrative for the one or more portions of the displayed data visualization.

716 The text narrative includes a plurality of sentences. For each sentence of the plurality of sentences in the text narrative, determine whether the respective sentence includes one or more respective keywords referencing data elements in the displayed data visualization. When the respective sentence includes one or more respective keywords referencing respective data elements in the displayed data visualization, generate a respective correlation between the respective keywords and the respective data elements.

718 Generating a respective correlation between the respective keywords and the respective data elements includes linking the respective keywords in the text narrative to the respective data elements in the displayed data visualization.

720 Receive a second user interaction with a first portion of the text narrative. In response to receiving the second user interaction: when the first portion of the text narrative is correlated to a first data element in the data visualization: (i) determine a second portion of the displayed data visualization corresponding to the first data element; and (ii) simultaneously visually emphasize the first portion of the text narrative and the second portion of the displayed data visualization.

722 After obtaining the text narrative, generate a second prompt in accordance with the text narrative.

724 Input the second prompt into the LLM and obtain, from the LLM, a title for the text narrative.

726 Generate a self-contained story based on the text narrative and the title.

728 Concurrently display the story and the data visualization.

B

Figure 7B

AUTHORING DATA STORIES WITH GENERATIVE AI

RELATED APPLICATIONS

This application claims priority to U.S. Provisional Application No. 63/463,046, filed Apr. 30, 2023, entitled "DataTales: Authoring Data Stories with Generative AI," which is hereby incorporated by reference herein in its entirety.

TECHNICAL FIELD

The disclosed implementations relate generally to data visualization and more specifically to systems, methods, and user interfaces that enable authoring of data-driven articles using large language models (LLMs).

BACKGROUND

Authoring data-driven articles is a complex process that requires authors to not only analyze data for insights but also craft a cohesive narrative that effectively communicates the insights.

SUMMARY

There is increasing interest in leveraging LLMs to support writing tasks. However, authoring data-driven articles using LLMs has several limitations. In particular, direct prompting is a challenging mode of interaction, and a particularly cumbersome one when considering all the data analysis context that goes into a data story. There are also errors and hallucinations that require manual inspection and verification. In the case of data stories, there is also a need to align narratives to visuals.

Disclosed herein are methods, user interfaces, and systems for authoring data stories with LLMs. The disclosed system and user interfaces, also referred to herein as "DataTales," leverages a LLM (or any generative artificial intelligence (AI) systems) to generate textual narratives accompanying a given chart.

Based on the deep intertwining of charts and text in these articles, and targeting the intermediate stages of the visual storytelling process where authors are actively building a story based on exploratory findings, the present disclosure describes chart interaction as a more intuitive alternative to direct prompting for conveying narrative intent to an LLM.

As disclosed, DataTales generates textual content for an accompanying chart (e.g., a data visualization) and allows authors to add chart annotations to guide focus of the story. Authors can use the generated text as-is, edit portions of the text, or generate multiple instances to pick-and-choose what they like.

In accordance with some implementations, a method of authoring data stories with large language models (LLMs) is performed at a computing device having a display, one or more processors, and memory. The memory stores one or more programs configured for execution by the one or more processors. The method includes receiving a first user interaction with one or more portions of a data visualization that is displayed on the computing device. The method includes, in response to receiving the first user interaction, generating a first prompt that includes a first plurality of parameters. The first plurality of parameters includes a first parameter specifying a visualization type of the displayed data visualization, a second parameter specifying a data array corresponding to data marks of the displayed data visualization, and a third parameter specifying a title of the displayed data visualization. The method includes inputting the first prompt into a large language model (LLM) and obtaining, from the LLM, a text narrative for the one or more portions of the displayed data visualization. The method includes, after obtaining the text narrative, generating a second prompt in accordance with the text narrative. The method includes inputting the second prompt into the LLM and obtaining, from the LLM, a title for the text narrative. The method includes generating a self-contained story based on the text narrative and the title, and concurrently displaying the story and the data visualization.

In some implementations, the first user interaction further includes one or more user-specified annotations on the data visualization. In some implementations, the first plurality of parameters includes a fourth parameter specifying the one or more user-specified annotations.

In some implementations, the text narrative includes a plurality of sentences. The method includes, for each sentence of the plurality of sentences in the text narrative, determining whether the respective sentence includes one or more respective keywords referencing data elements in the displayed data visualization. The method includes, when the respective sentence includes one or more respective keywords referencing respective data elements in the displayed data visualization, generating a respective correlation between the respective keywords and the respective data elements.

In some implementations, generating a respective correlation between the respective keywords and the respective data elements includes linking the respective keywords in the text narrative to the respective data elements in the displayed data visualization.

In some implementations, the method includes receiving a second user interaction with a first portion of the text narrative. The method includes, in response to receiving the second user interaction: when the first portion of the text narrative is correlated to a first data element in the data visualization: (i) determining a second portion of the displayed data visualization corresponding to the first data element; and (ii) simultaneously visually emphasizing the first portion of the text narrative and the second portion of the displayed data visualization.

In some implementations, the method includes inputting, into the LLM, a third prompt specifying the text narrative and obtaining, from the LLM, an outline of the text narrative. The method includes updating the story to include the outline between the title and the text narrative, and concurrently displaying the data visualization with the updated story.

In some implementations, the outline comprises a bullet-point summary. The third prompt includes a fourth parameter specifying the number of bullet points in the summary.

In some implementations, the fourth parameter is specified by a user.

In some implementations, the fourth parameter is specified by the computing device.

In some implementations, the method includes, after concurrently displaying the data visualization with the updated story, receiving user input modifying the text narrative of the updated story. The method includes, in response to receiving the user input: (i) executing the third prompt in accordance with the modified text narrative; (ii) obtaining, from the LLM, an updated outline corresponding to the modified text narrative; and (iii) concurrently displaying the modified text narrative, the updated outline, and the data visualization.

In some implementations, the method includes, after concurrently displaying the data visualization with the updated story, receiving user input modifying content of the outline. The method includes, in response to receiving the user input: (i) generating a fourth prompt that includes a second plurality of parameters, the second plurality of parameters including a fifth parameter specifying the content of the outline; (ii) inputting the fourth prompt into the LLM and obtaining, from the LLM, an updated text narrative for the one or more portions of the displayed data visualization; (iii) inputting the second prompt into the LLM and obtaining, from the LLM, an updated title for the updated text narrative; (iv) generating an updated story based on the updated text narrative and the updated title; and (v) concurrently displaying the updated story and the data visualization, including displaying the modified content of the outline between the updated title and the updated text narrative.

In accordance with some implementations, a computing device includes a display, one or more processors, and memory coupled to the one or more processors. The memory stores one or more programs configured for execution by the one or more processors. The one or more programs include instructions for performing any of the methods disclosed herein.

In accordance with some implementation, a non-transitory computer readable storage medium stores one or more programs configured for execution by a computing device having a display, one or more processors, and memory. The one or more programs include instructions for performing any of the methods disclosed herein.

Thus methods, systems, and graphical user interfaces are disclosed that allow users to author data-driven articles using large language models (LLMs).

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

FIG. 4 illustrates exemplary chart annotations, in accordance with some implementations.

FIGS. 7A to 7E provide a flowchart of a method of authoring data stories with large language models (LLMs), in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

Data-driven articles that feature primarily textual narratives containing claims and insights backed by data and illustrated with data visualizations are a popular means of communication in fields like journalism and business reporting. Authoring data-driven articles, however, is often a complex and tedious process. Authors need to analyze the data to identify insights, order insights in an appropriate sequence, and write a cohesive narrative to communicate those insights with effective transitions and appropriate domain context.

The emergence of contemporary LLMs and their remarkable text generation capabilities has led to increased interest in assessing their value for a range of creative writing tasks, including data storytelling. This technology has the potential to fundamentally reshape the way people use writing tools. In particular, different writing genres may benefit from purpose-specific features built around these LLMs. At the same time, this technology introduces new challenges such as unreliable outcomes, lack of domain understanding, prompt complexity, and ethical concerns, which can be circumvented by thoughtful design solutions.

Figure 1A:
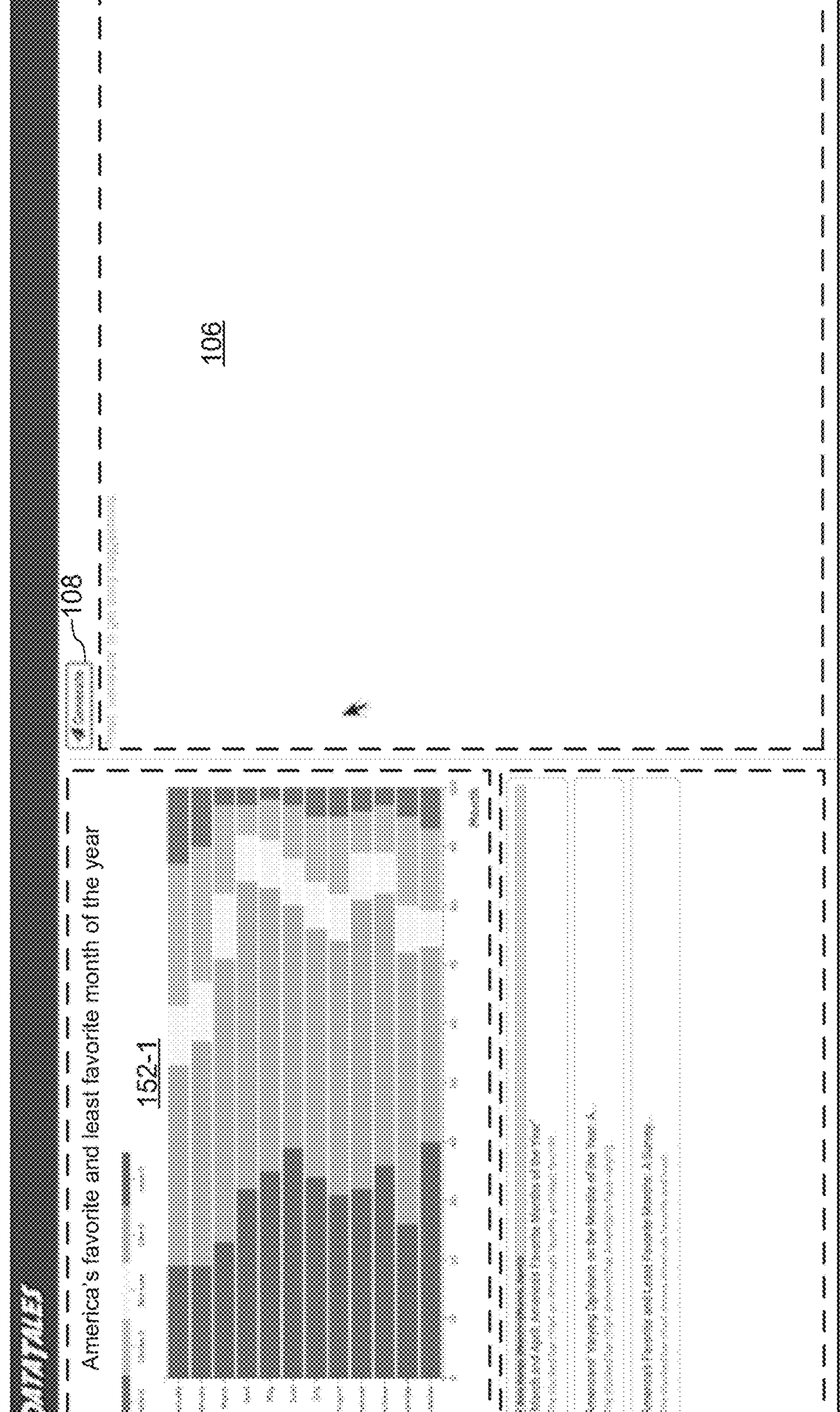
FIG. 1A illustrates an exemplary user interface for DataTales, in accordance with some implementations.

FIG. 1A illustrates an exemplary graphical user interface 100 for DataTales (e.g., the application 230), in accordance with some implementations. The graphical user interface 100 includes an interactive visualization panel 102 for displaying a data visualization 152-1, a panel 104 for displaying a history of generated stories, and a generated stories panel 106. In some implementations, user selection of the "Generate" button 108 in FIG. 1A causes DataTales to initiate a story-generation process.

Figure 1B:
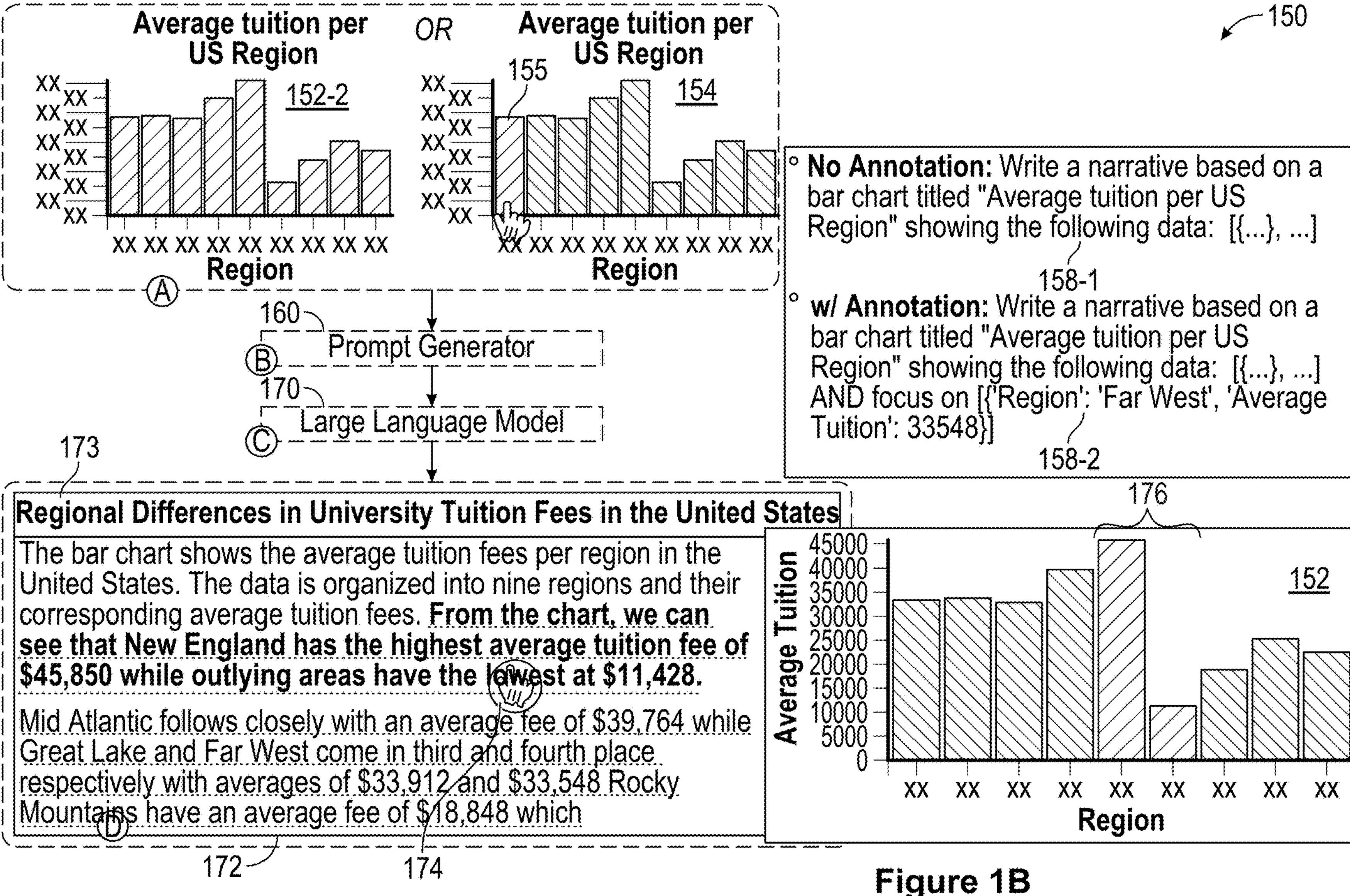
FIG. 1B illustrates an exemplary workflow for authoring data-driven articles using DataTales, in accordance with some implementations.

FIG. 1B illustrates an exemplary workflow 150 for authoring data-driven articles using DataTales, in accordance with some implementations. Given a data visualization 152-2 (e.g., a chart) and an optional set of annotations 154, DataTales can generate a story based on at least a portion of the data visualization 152 (e.g., a chart).

A user can designate the entire data visualization 152-2 that is displayed in the graphical user interface 100 for input, or optionally add annotations 154 to guide the LLM 170 to emphasize specific data points, data marks, or ranges of values when generating its response. For instance, FIG. 1B shows an example where an author highlights a data mark 155 of bar chart 152-2, indicating that the user would like the application 230 to focus on this data mark when generating a story. In some implementations, DataTales supports various annotations including mark selection, color legend range selection, and axis range selection, which can be combined for more complex guidance.

In some implementations, in accordance with receiving the user interaction, DataTales (e.g., via a prompt generator 160) generates one or more prompts, such as prompt 158-1 and prompt 158-2, and inputs the prompts into a large language model (LLM) 170. DataTales receives, from the LLM 170, a text narrative 172 that is then interactively linked to the chart 152.

In some implementations, DataTales also receives from the LLM 170 a proposed title 173 for the story, which DataTales displays in the graphical user interface 100 concurrently with the text narrative 172.

In some implementations, after displaying the story, DataTales receives a user interaction 174 (e.g., a mouse hover action) with a portion of the text narrative. In response to receiving the user interaction 174, DataTales visually emphasizes (e.g., highlights, underlines, bolds, or italicizes) the portion of the text narrative 172 and simultaneously visually emphasizes a portion of the chart 152 corresponding to the portion of the text narrative 172. In some implementations, when DataTales receives user selection of (or user interaction with) a portion of a chart, it visually emphasizes the portion 176 of the chart and simultaneously visually emphasizes a portion of the text narrative describing the portion of the chart that has been selected by the user. The text narrative 172 can be further edited by a user.

In some implementations, DataTales is implemented as a web application 330 using a React and Python Flask setup. It features a curated list of datasets 260, with respective charts rendered using D3.js. In some implementations, the LLM 170 is OpenAI's API for the 'gpt-3.5-turbo' model 1, or any commercially-available LLM.

As disclosed, DataTales covers a wide array of charts commonly found in data-driven reports and articles, including bar charts with variants like stacked and group bars, scatterplots, single- and multi-series line charts, and choropleth maps. In some implementations, DataTales is used to generate data stories using predefined charts covering datasets such as demographic survey responses, unemployment rates, automobile data, and Olympic medal winner history.

Figure 2:
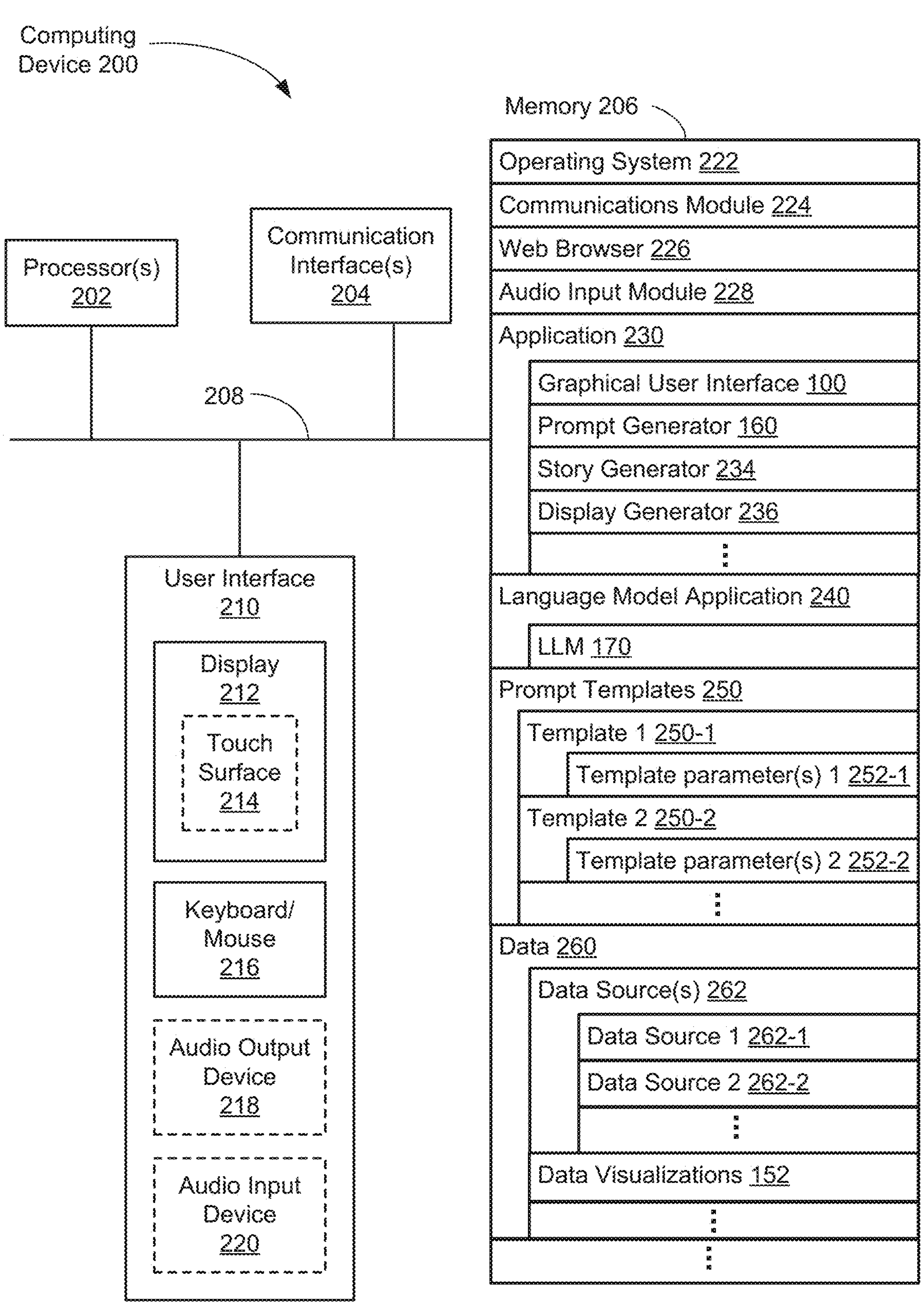
FIG. 2 is a block diagram of a computing device for authoring data stories, in accordance with some implementations.

FIG. 2 is a block diagram of a computing device 200 for authoring data stories, in accordance with some implementations. Various examples of the computing device 200 include a desktop computer, a laptop computer, a tablet computer, and other computing devices that have a display and a processor capable of running an application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module), which processes audio captured by the audio input device 220. The captured audio may be sent to a remote server (e.g., a server system 300) and/or processed by an application executing on the computing device 200 (e.g., an application 230 or a natural language processor);
- an application 230 (e.g., DataTales). In some implementations, the application 230 includes:
  - a graphical user interface 100 (e.g., the DataTales user interface 100 illustrated in FIG. 1A), which displays data visualizations (e.g., charts and line plots) and receives user interactions with the displayed visualizations;
  - a prompt generator 160, which generates prompts, such as prompt 158-1 and prompt 158-2, and inputs the prompts into a language model application 240 (e.g., LLM 170). In some implementations, the prompt generator 160 generates prompts using prompt templates 250;
  - a story generator 234, which generates self-contained stories based on text narratives received from the language model application 240 and one or more titles of data visualizations 152; and
  - a display generator 236, which interactively links the data visualizations and the stories. In some implementations, the display generator 236 uses a combination of dependency parsing and keyword matching to map phrases in sentences of text narratives (that are generated by the LLM 170) to data fields and/or data values in the visualized data;

a language model application 240 (e.g., an LLM 170), which generates text narratives based on data visualizations and/or their annotations that are displayed in the graphical user interface 100;

prompt templates 250 (e.g., prompt templates 250-1 and 250-2). In some implementations, a respective prompt template 250 includes a set of one or more template parameters 252 (e.g., template parameters 252-1 and 252-2);

data 260, including:

zero or more data sources 262 or datasets (e.g., a first data source 262-1 and a second data source 262-2), which are used by the application 230. A data source or dataset includes one or more data fields and data values associated with the data fields. The data fields can include dimensional data fields (e.g., categorical data fields, having categorical data values). The data fields can include measure data fields (e.g., quantitative data fields). In some implementations, the data sources are stored as spreadsheet files, CSV files, XML files, flat files, or JSON files, or stored in a relational database. In some implementations, a user selects one or more databases or data sources 260 (which may be stored on the computing device 200 or stored remotely) and input queries are directed to the selected data source; and one or more data visualizations 152.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above. In some implementations, a subset of the programs, modules, and/or data stored in the memory 206 is stored on and/or executed by the server system 300.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
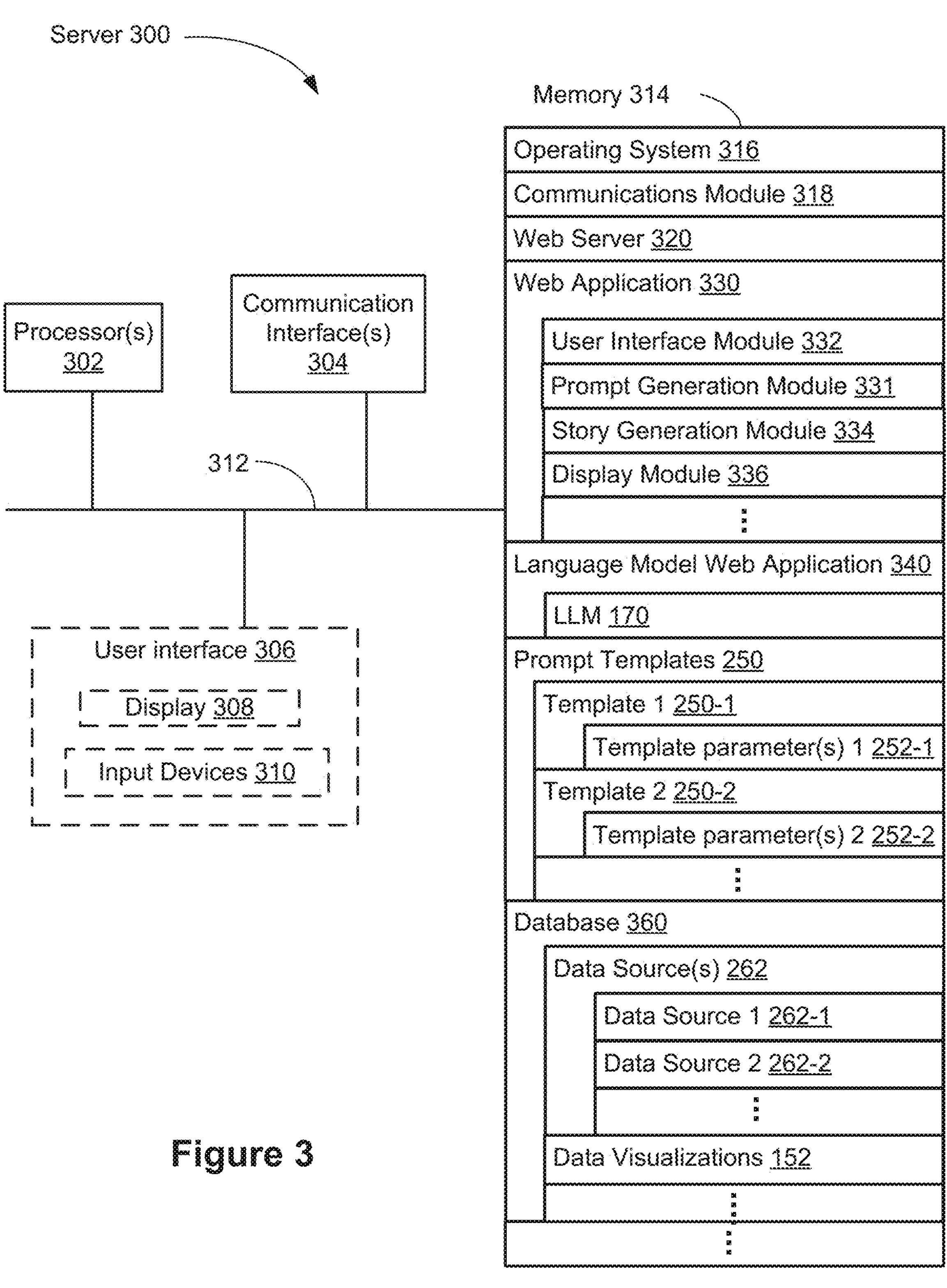
FIG. 3 is a block diagram of a server system, in accordance with some implementations.

FIG. 3 is a block diagram of a server system 300, in accordance with some implementations. The server system 300 typically includes one or more processing units/cores (CPUs) 302, one or more network interfaces 304, memory 314, and one or more communication buses 312 for interconnecting these components. In some implementations, the server system 300 includes a user interface 306, which includes a display 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprises a non-transitory computer readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communications module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a web application 330 (e.g., the DataTales web application), which may be downloaded and executed by a web browser 226 on a user's computing device 200. In general, a web application 330 has the same functionality as a desktop application 230, but provides the flexibility of access from any device at any location with network connectivity, and does not require installation and maintenance. In some implementations, the web application 330 includes various software modules to perform certain tasks, such as:

a user interface module 332, which provides the user interface for all aspects of the web application 330;

a prompt generation module 331, which has the same functionality as the prompt generator 160;

a story generation module 334, which has the same functionality as the story generator 234; and a display module 336, which has the same functionality as the display generator 236;

a language model web application 340, including an LLM 170; and prompt templates 250 (e.g., templates 250-1 and 250-2, with corresponding parameters 252-1 and 252-2).

In some implementations, the server system 300 includes a database 360. The database 360 stores zero or more data sources 262 (e.g., datasets), such as the data sources 262-1 and 262-2. In some implementations, the database 360 stores one or more data visualizations 152. The database 360 may be separate from the server system 300, or may be included with the server system 300, or both.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

Prompt Generation

A key idea underpinning DataTales is that it can take a chart or an annotated chart as input and leverage an LLM to recommend data-driven narratives. FIG. 1B shows exemplary prompts 158 (e.g., prompts 158-1 and 158-2) generated by DataTales.

In some implementations, the general template for generating data narratives is as follows:

Write a narrative based on a [chartType] showing the following data: [chartData] on the topic "[chartTitle]" focusing on: [chartAnnotations*]

where, * indicates an optional parameter that is included in the prompt only if it is available in the input chart. chartData is the data array that is bound to the marks and chartAnnotations is a list of data items for selection annotations (e.g., {Year: 2000, Country: Australia}) and/or values in the case of axis brush annotations (e.g., {Year between [1980, 2001] }).

FIG. 4 illustrates exemplary chart annotations, in accordance with some implementations. DataTales supports various annotations including mark selection, color legend range selection, and axis range selection, which can be combined for more complex guidance.

In some implementations, once a narrative is generated, DataTales prompts the LLM again to generate a title:

Suggest a title for the following narrative: [narrativeText].

The title and text are sent to the DataTales front-end as a self-contained story. Linking the generated text to the input chart In some implementations, after the LLM 170 generates the narrative, DataTales proactively processes the generated story to identify data references. Some implementations use a combination of dependency parsing and keyword matching to map phrases in a sentence to attributes (e.g., data fields) and values (e.g., data values of data fields) in the visualized data, similar to natural language systems for visualization. DataTales highlights whole sentences containing data references (e.g., using a dotted underline) to emphasize that the sentence talks about a specific set of marks on the chart. In some implementations, the text and chart are interactively linked. For example, when a user (e.g., an author) hovers over a highlighted sentence, DataTales highlights relevant portions of the chart, thereby aiding reading and comprehension.

Figure 5:
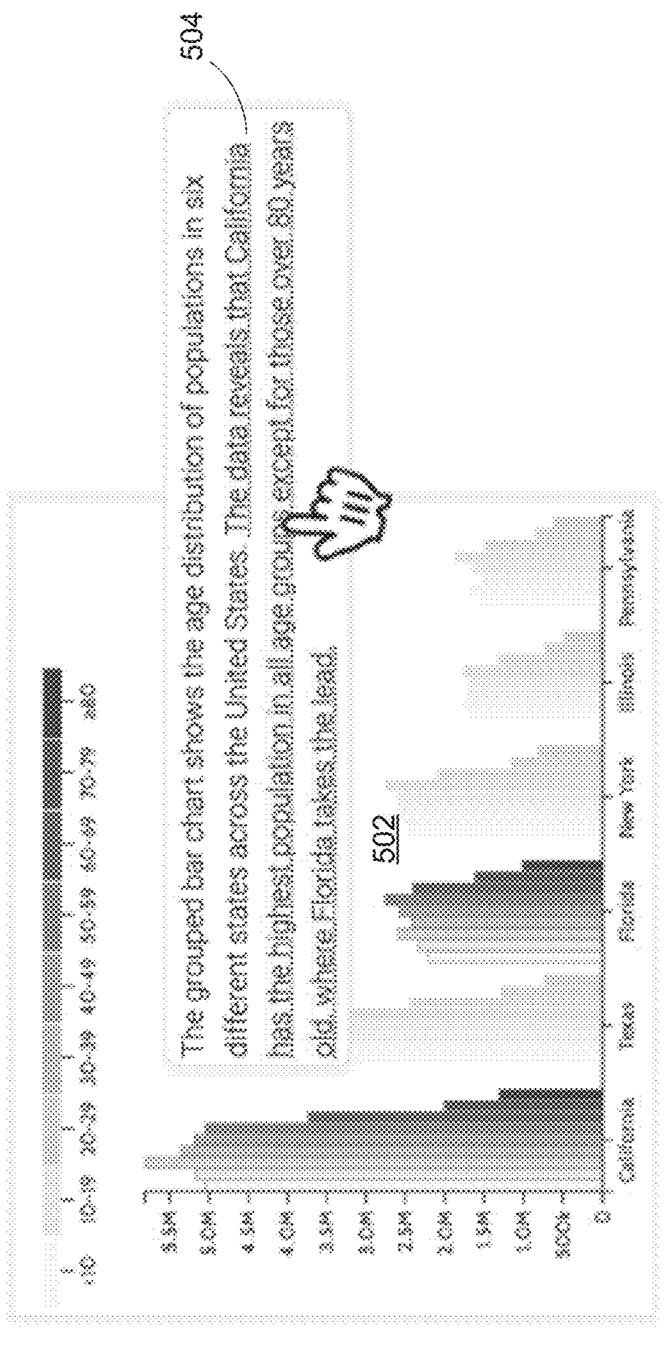
FIG. 5 illustrates an example of an incorrect statement generated by an LLM, in accordance with some implementations.

Besides improving readability, this "text→chart" linking facilitates visually seeing the data in the chart being referred to in the text, which further serves as a quick verification for potential hallucinations or incorrect interpretations by the LLM. FIG. 5 illustrates an example of an incorrect statement generated by the LLM 170, in accordance with some implementations. Contrary to the text 504, the chart 502 shows that Florida does not have a higher number of people over the age of 80 compared to California. Thus, the text→chart linking feature helps verify the statement and identify the erroneous interpretation by dynamically highlighting the two states. Authors can then redact the stories themselves, and their edits are shown in a different italicized format.

Figure 6A:
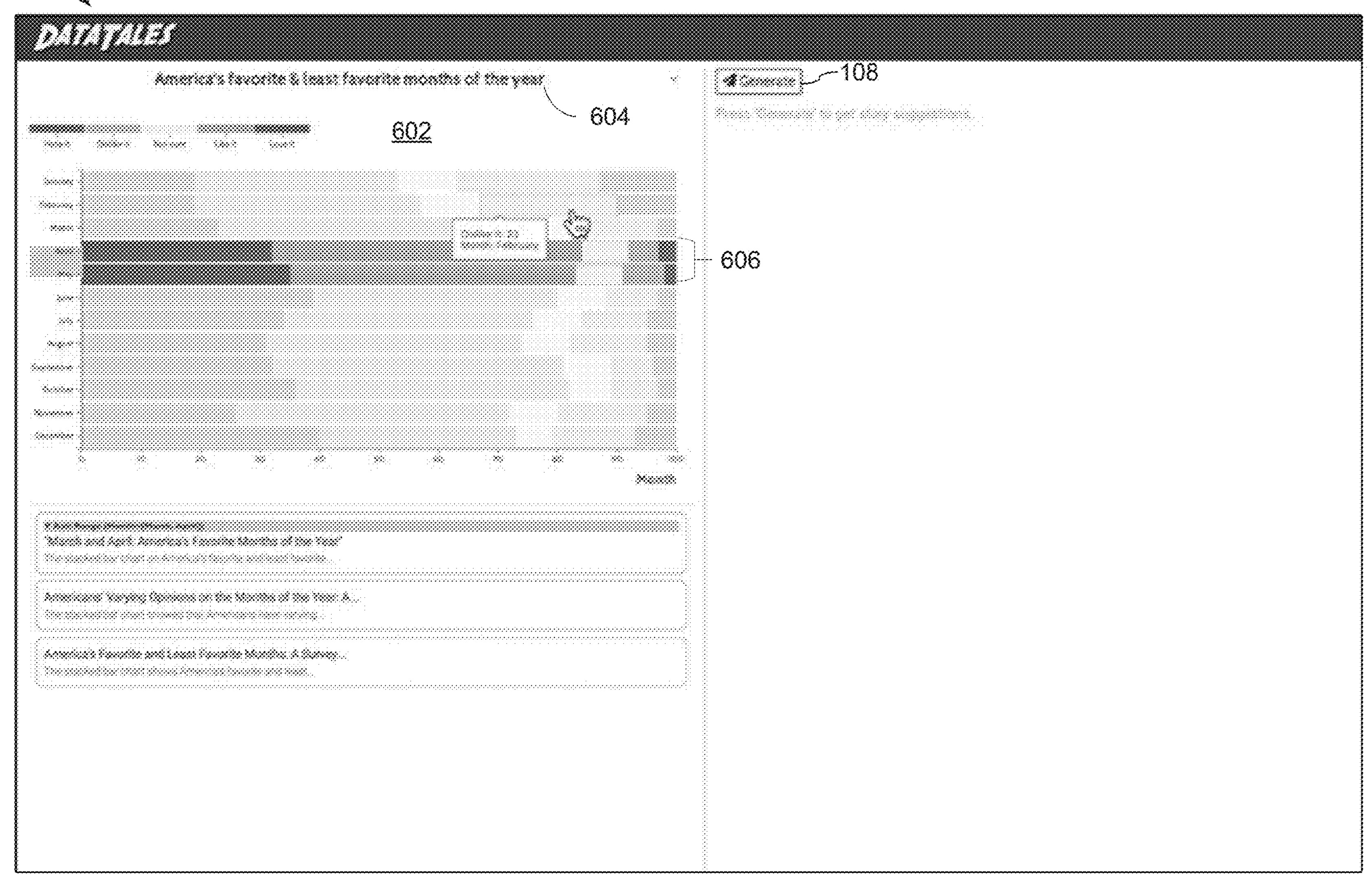
FIGS. 6A to 6D illustrate a series of screenshots for author data-driven articles using DataTales, in accordance with some implementations.

FIGS. 6A to 6D illustrate a series of screenshots for author data-driven articles using DataTales, in accordance with some implementations. FIG. 6A shows a graphical user interface 100 that displays a chart 602 (e.g., a data visualization) having a title 604 "America's favorite & least favorite months of the year." In FIG. 6A, a user selects (e.g., annotates) the data bars 606 corresponding to the months of April and May, and selects the "Generate" button 108 to initiate generation of a story that emphasizes the data represented by the data bars 606.

DataTales creates a prompt including features from the input chart and annotations. In this example, DataTales creates the prompt:

Write a narrative based on a stacked bar chart titled "America's favorite & least favorite months of the year" showing the following data: [ . . . ] AND focus on {Month between [April, May]}

Figure 6B:
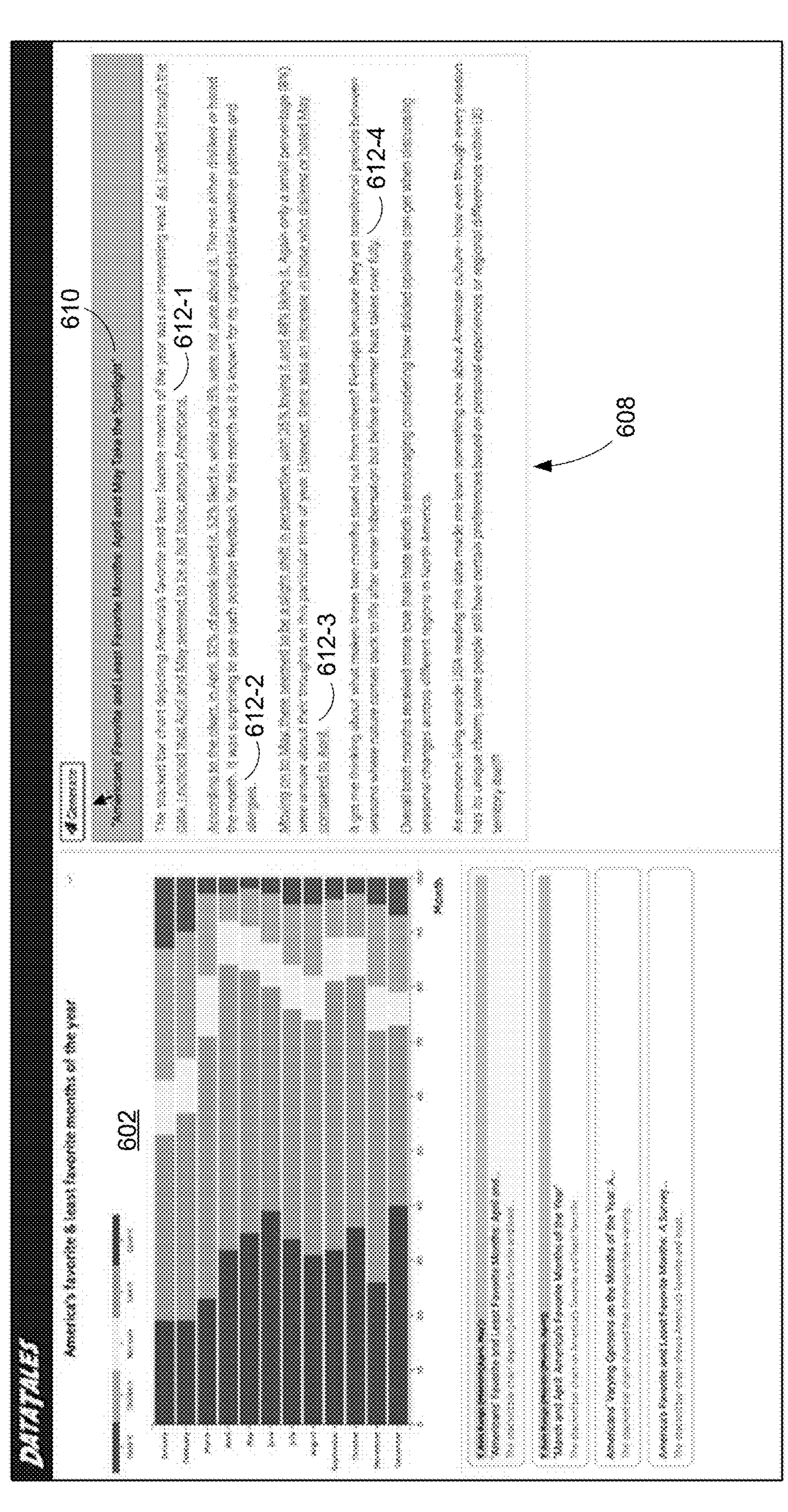
Figure 6C:
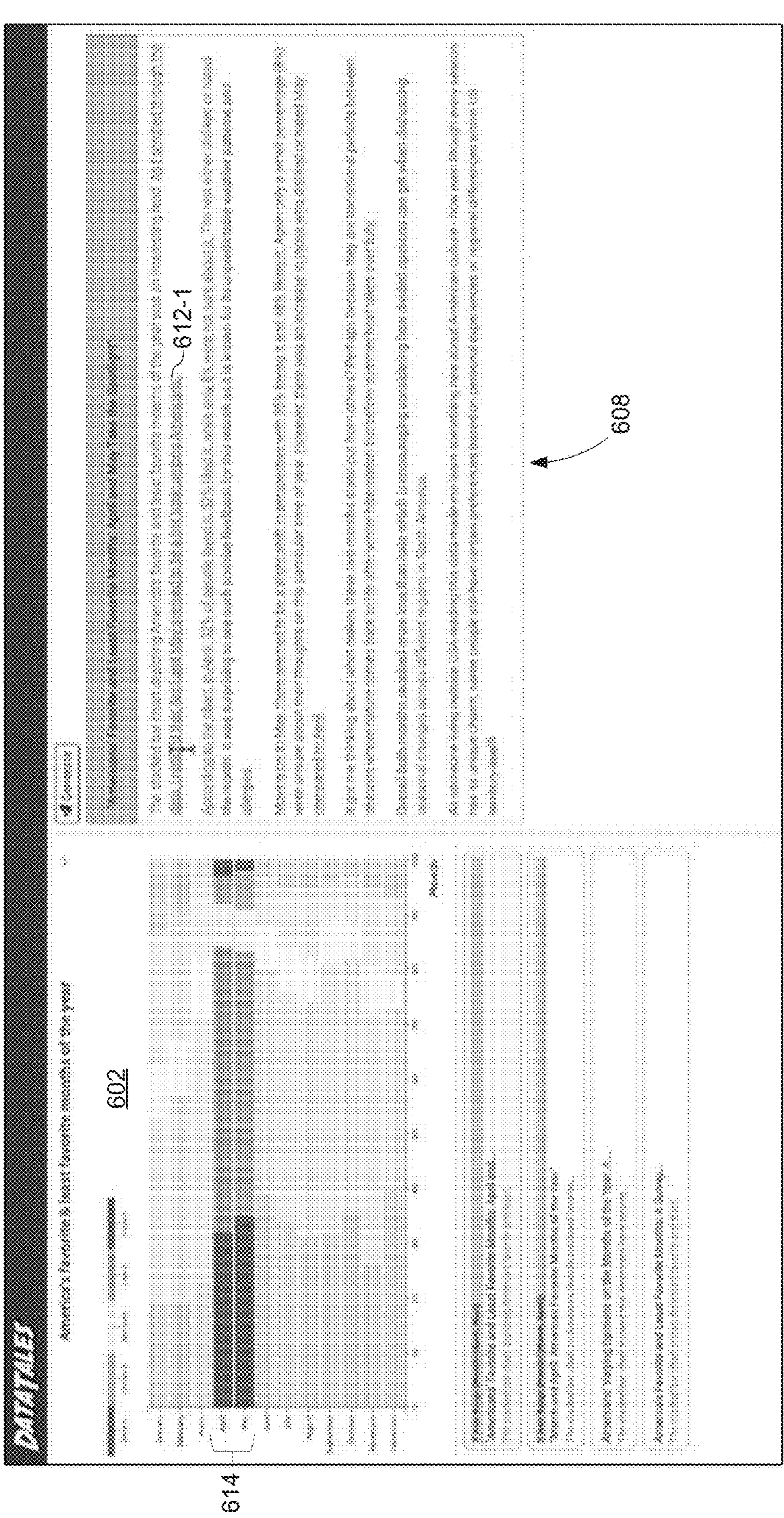
Figure 6D:
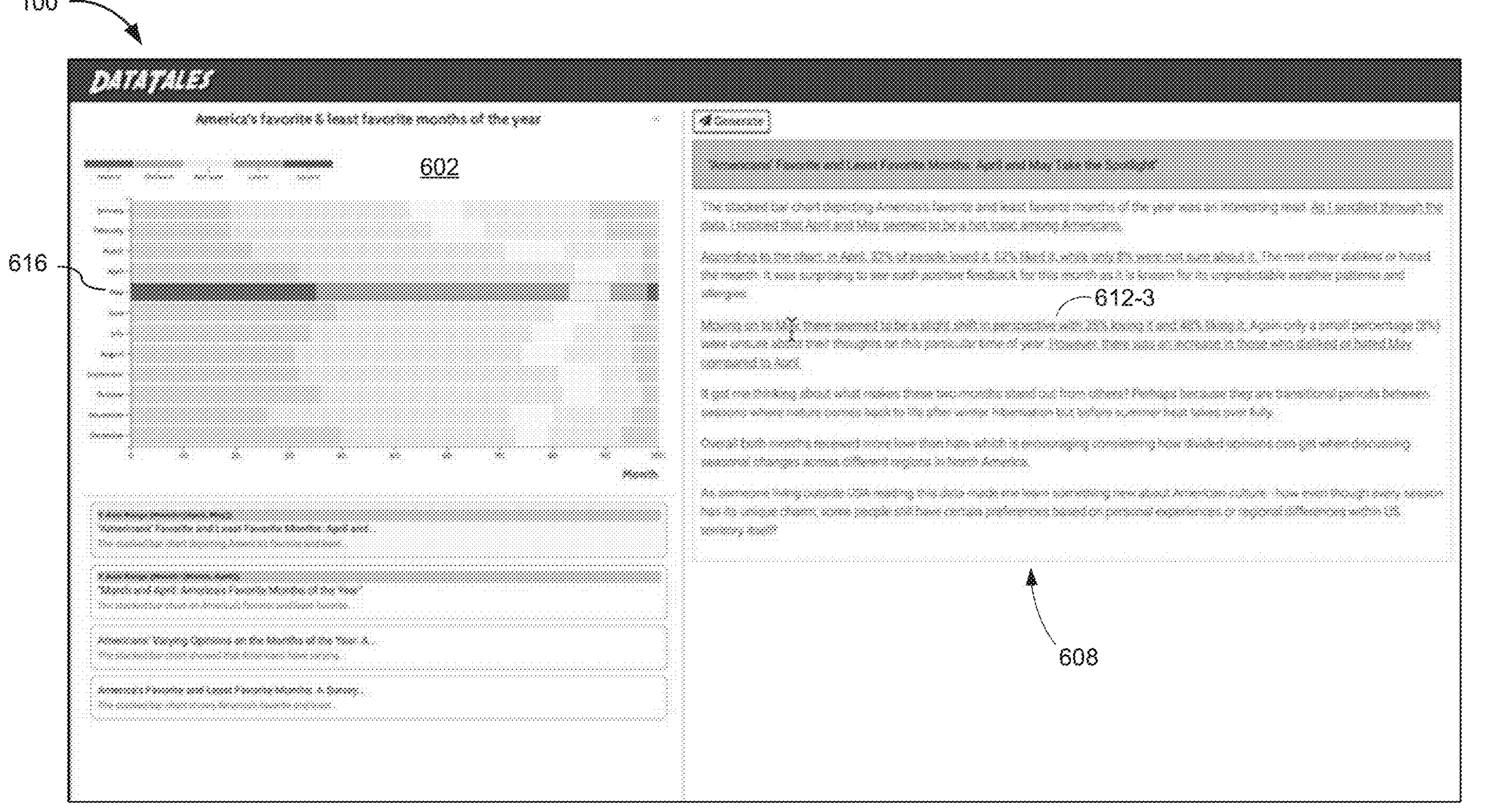

DataTales passes this prompt to the language model 240 (e.g., the LLM 170) to generate both the text 608 and a proposed title 610 for the story. This is illustrated in FIG. 6B. To aid reading and comprehension of the generated text, DataTales implicitly highlights sentences such as sentence 612-1 to sentence 612-4 that contain data references, allowing users to interact with the text to see relevant portions of the chart. For example, in FIG. 6C, a user interacts with first sentence 612-1 of the text 608. DataTales simultaneously visually emphasizes corresponding data marks 614 (e.g., data bars) of the chart 602, corresponding to the months April and May, that are referenced in the first sentence 612-1. In FIG. 6D, the user interacts with the third sentence 612-3. DataTales simultaneously visually emphasizes a data mark 616 (a data bar) of the chart 602, corresponding to the month May that is referenced in the third sentence 612-3.

Flowchart

FIGS. 7A to 7E provide a flowchart of a method 700 of authoring data stories with large language models (LLMs), in accordance with some implementations. In some implementations, the method 700 is performed (702) at a computing device 200 having a display 212, one or more processors 202, and memory 206. The memory stores (704) one or more programs configured for execution by the one or more processors.

In some implementations, the operations shown in FIGS. 1A, 1B, 4, 5, and 6A to 6D correspond to instructions stored in the memory of the computing device 200 (e.g., memory) or other non-transitory computer-readable storage medium. In some implementations, the computer-readable storage medium includes a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 700 may be combined and/or the order of some operations may be changed.

The computing device receives (706) a first user interaction with one or more portions of (e.g., the entire displayed chart, or user annotated regions of the displayed chart) a data visualization that is displayed on the computing device.

In some implementations, the first user interaction includes (708) one or more user-specified annotations on the data visualization. For example, the annotations can include mark selection, color legend range selection, and axis range selection.

The computing device, in response to receiving the first user interaction, generates (710) (e.g., automatically, by the computing device, without user intervention) (e.g., via prompt generator 160) a first prompt that includes a first plurality of parameters. In some implementations, the first prompt has the form "Write a narrative based on a [chartType] showing the following data: [chartData] on the topic "[chartTitle]". The first plurality of parameters includes: a first parameter specifying a visualization type of the displayed data visualization (e.g., [chartType]), a second parameter specifying a data array (e.g., a serialized dataset, data that is transformed into a string) corresponding to (e.g., specifying one or more characteristics of) data marks of the displayed data visualization (e.g., [chartData]), and a third parameter (e.g., [chartTitle]) specifying a title of the displayed chart.

In some implementations, the first plurality of parameters includes (712) a fourth parameter specifying the one or more user-specified annotations. For example, in some implementations, the first prompt has the form "Write a narrative based on a [chartType] showing the following data: [chartData] on the topic "[chartTitle]" focusing on: [chartAnnotations]). The fourth parameter is "[chartAnnotations]."

The computing device inputs (714) the first prompt (e.g., a string input) into a large language model (LLM) 170 and obtains, from the LLM, a text narrative (visual text narrative) for the one or more portions of the displayed data visualization.

In some implementations, the only visualization-related input that is provided to the LLM is the [chartType] variable, which is the name of the chart type in question (e.g., "bar chart" or "line chart"). In some implementations, in addition to the first prompt, a script that describes the data visualization (e.g., in Vega-Lite) can also be input into the LLM.

In some implementations, the LLM is configured to receive multimodal input prompts (e.g., text and images). In this case, the method includes inputting the first prompt as well as the data visualization (e.g., as a pdf or an image file) into the LLM. In some implementations, an LLM that can parse a data visualization as an image or descriptive can also parse an annotated version of it.

In some implementations, the text narrative includes (716) a plurality of sentences such as sentence 612-1 to sentence 612-4. For each sentence of the plurality of sentences in the text narrative, the computing device determines (e.g., using a combination of dependency parsing and keyword matching to map phrases in a sentence to data fields and/or data values in the visualized data) whether the respective sentence includes one or more respective keywords (e.g., phrases) referencing data elements in the displayed data visualization. When the respective sentence includes one or more respective keywords referencing respective data elements in the displayed data visualization, the computing device generates a respective correlation between the respective keywords and the respective data elements In some implementations, generating a respective correlation between the respective keywords and the respective data elements includes linking (718) the respective keywords in the text narrative to the respective data elements in the displayed data visualization.

In some implementations, the computing device receives (720) a second user interaction with a first portion of the text narrative. In response to receiving the second user interaction: when the first portion of the text narrative is correlated to a first data element in the data visualization: the computing device determines a second portion of the displayed chart corresponding to the first data element, and simultaneously visually emphasizes the first portion of the text narrative and the second portion of the displayed data visualization. This is illustrated in FIGS. 6C and 6D.

The computing device, after obtaining the text narrative, generates (722) (e.g., automatically, without user intervention) a second prompt in accordance with the text narrative. In some implementations, the second prompt is "Suggest a title for the following narrative: [narrativeText]."

The computing device inputs (724) the second prompt into the LLM and obtains, from the LLM, a title for the text narrative.

The computing device generates (726) a self-contained story based on the text narrative and the title.

The computing device concurrently displays (728) the story and the data visualization.

For most tabular visualizations, the overall structure of a data array with data objects for each row does not really change much whether it is rendering a bar chart, a line chart, a scatterplot, or any type of data visualization. In some JSON formats, a tabular dataset with fields Field1, Field2, . . . FieldN looks like:

```
[ {Field1:"value_row1Field1", Field2: "value_row1Field2"....,
FieldN:"value_row1FieldN"}, {Field1:"value_row2Field1",
Field2: "value_row2Field2"....,
FieldN:"value_row2Fieldn"}, ...]
```

In some implementations, an example of an XML serialization is:

```
<Data>
  <Row Field1="value_row1Field1"
Field2="value_row1Field2" ... FieldN="value_row1FieldN"/>
  <Row Field1="value_row2Field1"
Field2="value_row2Field2" ... FieldN="value_row2FieldN"/>
    ...
<\Data>
```

In some implementations, non-tabular data (such as relationship graphs for node-link diagrams, or a hierarchical tree structure) utilize a different format than the one above because it does not follow the above row/column make up. Some implementations serialize these datasets into strings.

Figure 7C:
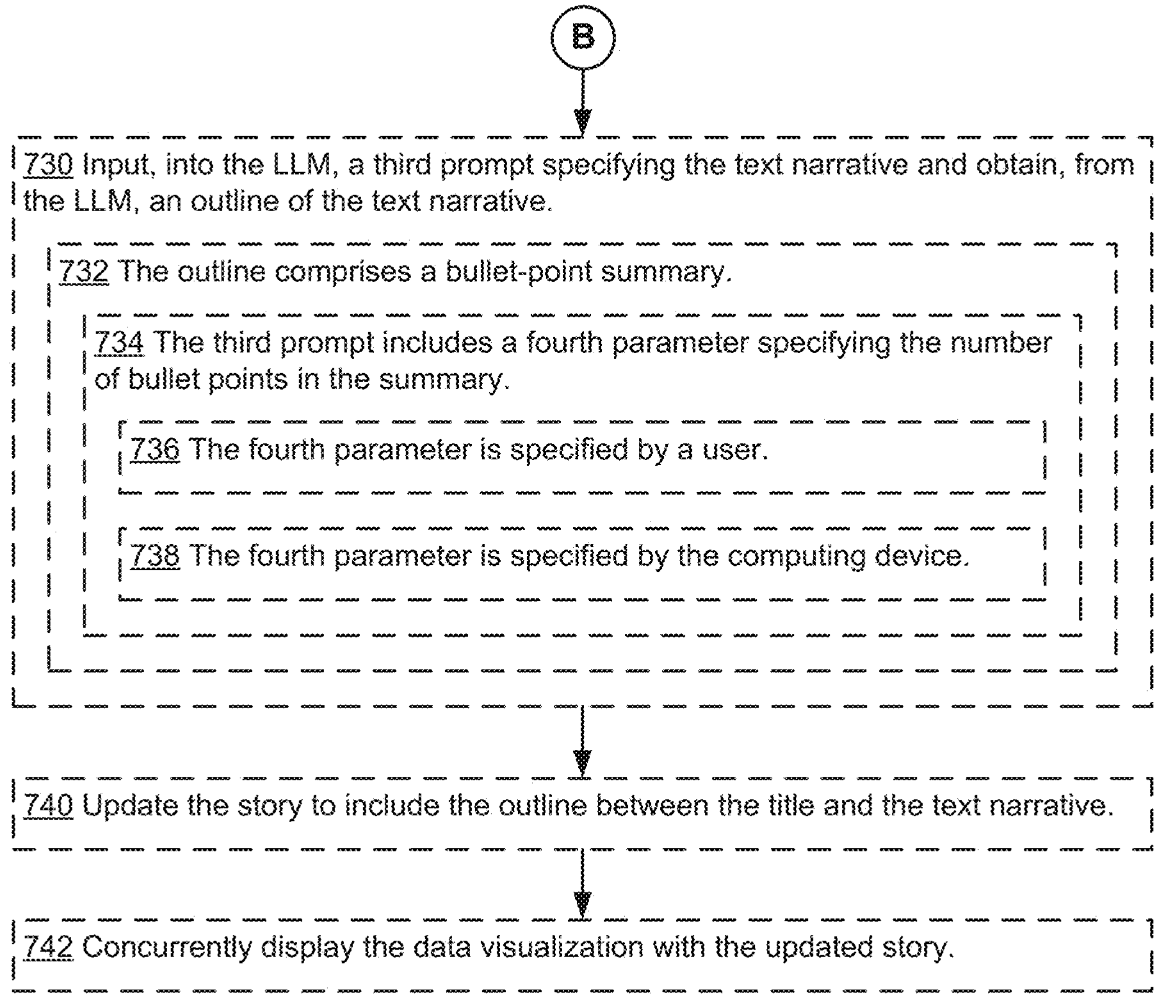

Referring now to FIG. 7C, in some implementations, the computing device inputs (730), into the LLM, a third prompt (e.g., an outline generation prompt) specifying the text narrative and obtains, from the LLM, an outline (e.g., a text summary) of the text narrative. For example, in some implementations, the third prompt has the form "Write a bullet-point summary (with up to 4 points) for the text: [narrativetext]." The goal of having an outline is to help navigate the many stories an author may generate for a chart, by providing something that takes less time to read. In some implementations, adding a size limit for the number of bullet points is to prevent needlessly long summaries (which defeats the purpose of having a summary in the first place).

In some implementations, the third prompt is the text narrative verbatim. In some implementations, the third prompt specifies a summary of the text narrative.

In some implementations, the outline comprises (732) a bullet-point summary.

In some implementations, the third prompt includes (734) a fourth parameter (e.g., "up to n points") specifying the number (i.e., a positive integer n) of bullet points in the summary. The number "4" (n=4) in the example third prompt above is exemplary. In some implementations, n is an integer between 1 and 5 inclusive.

In some implementations, the fourth parameter is specified (736) by a user.

In some implementations, the fourth parameter is specified (738) by the computing device.

In some implementations, the computing device updates (740) the story to include the outline between the title and the text narrative.

In some implementations, the computing device concurrently displays (742) the data visualization with the updated story.

Figure 7D:
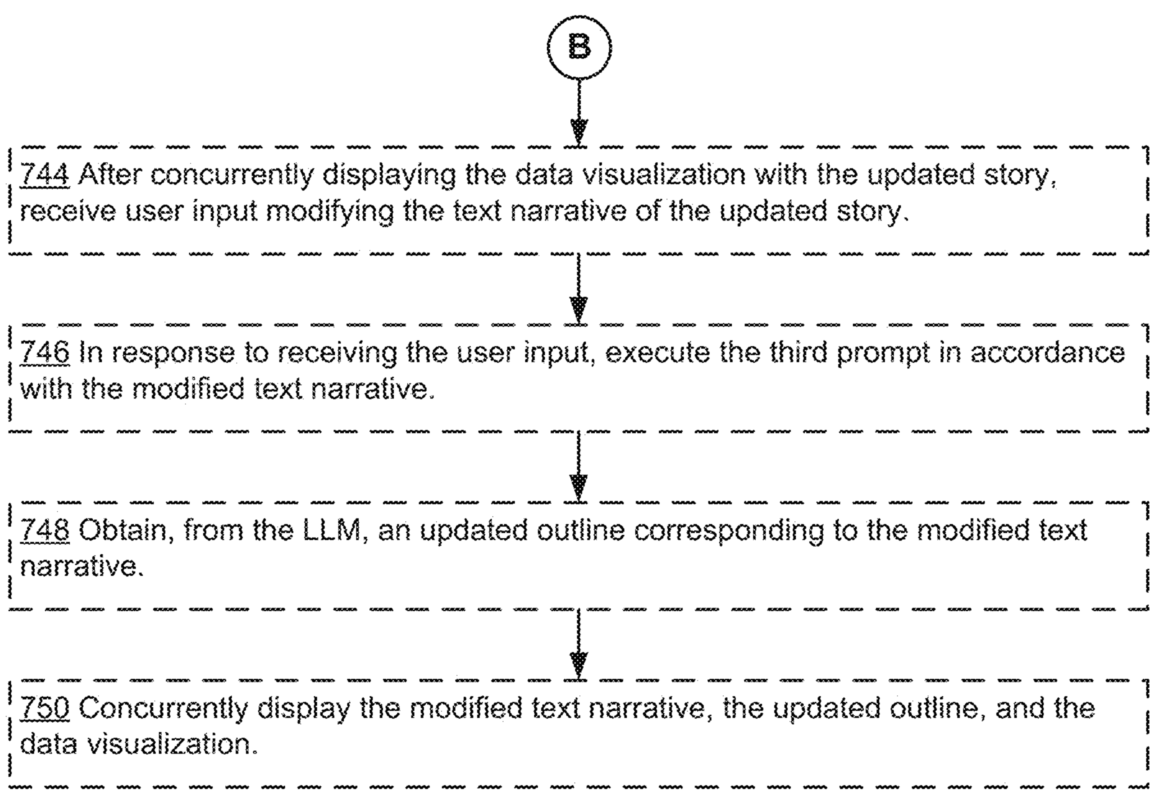

In some implementations, DataTales is capable of updating the outline based on the story. For example, in some implementations, after a user edits a story, the user can "refresh" an outline. Referring now to FIG. 7D, in some implementations, the computing device, after concurrently displaying the data visualization with the updated story, receives (744) user input modifying the text narrative of the updated story. In response to receiving the user input, the computing device executes (746) the third prompt (e.g., the outline generation prompt) in accordance with the modified text narrative. The computing device obtains (748), from the LLM, an updated outline corresponding to the modified text narrative. The computing device concurrently displays (750) the modified text narrative, the updated outline, and the data visualization.

Figure 7E:
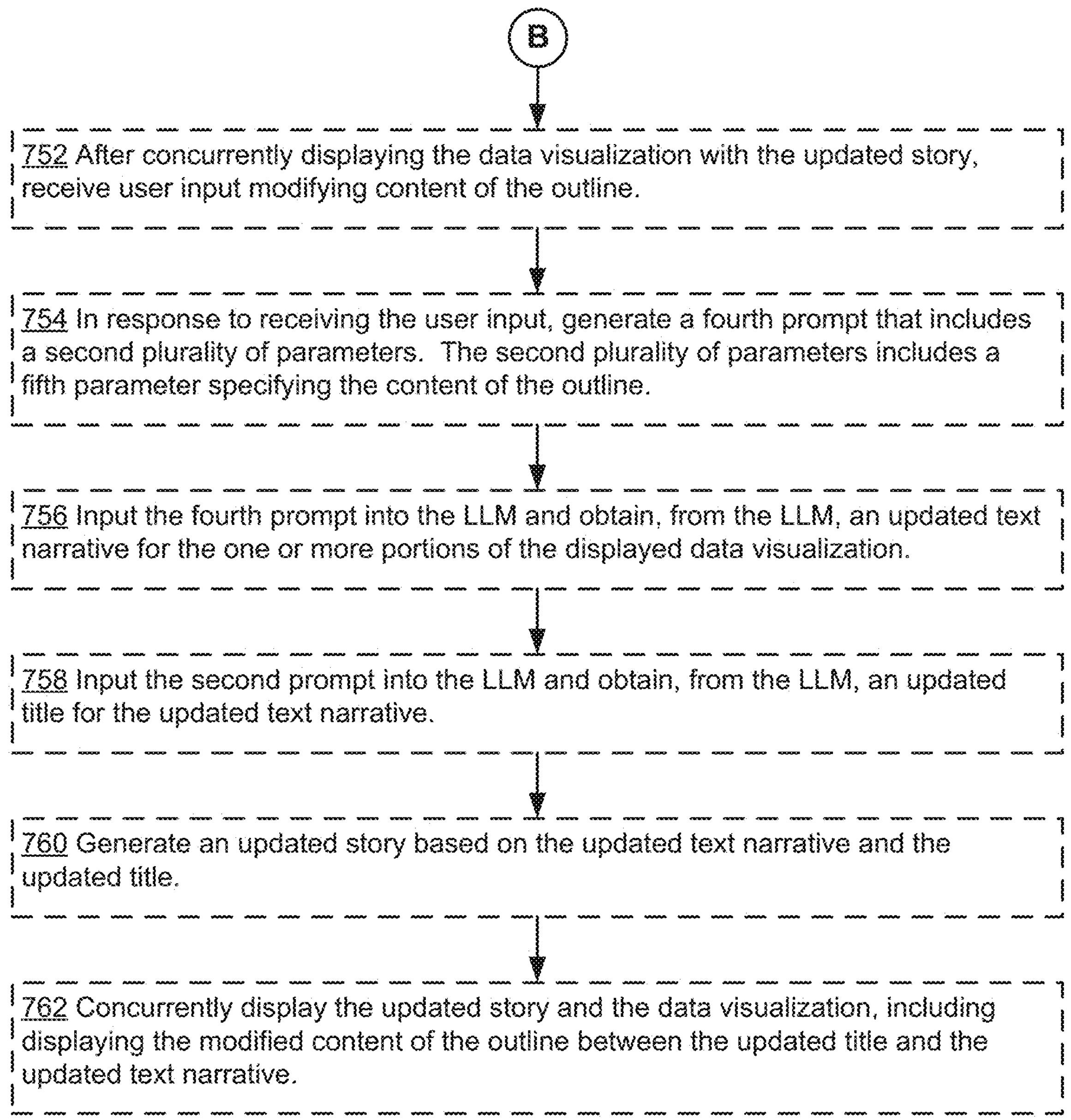

In some implementations, DataTales is capable of updating the story based on the outline. This means that outlines can also be used as input to guide the direction of a story. This is useful in cases where a user already knows what specific takeaways should be emphasized. One way to achieve this is to tweak the original story generation prompt to consider not only the annotations, but also the outline if one is available. Referring now to FIG. 7E, in some implementations, the computing device, after concurrently displaying the data visualization with the updated story, receives (752) user input modifying content of the outline. In response to receiving the user input, the computing device generates (754) (e.g., automatically, by the computing device, without user intervention) a fourth prompt (e.g., having the form "Write a narrative based on a [chartType] showing the following data: [chartData] on the topic [chartTitle] focusing on: [chartAnnotations] and respecting the following outline: [outlinePoints]"), which includes a second plurality of parameters. The second plurality of parameters includes a fifth parameter (e.g., [outlinePoints]) specifying the content of the outline. The computing device inputs (756) the fourth prompt into the LLM and obtains, from the LLM, an updated text narrative for the one or more portions of the displayed data visualization. In some implementations, the computing device inputs (758) the second prompt into the LLM and obtains, from the LLM, an updated title for the updated text narrative. In some implementations, the computing device generates (760) an updated story based on the updated text narrative and the updated title. In some implementations, the computing device concurrently displays (762) the updated story and the data visualization, including displaying the modified content of the outline between the updated title and the updated text narrative.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" entails each of the following possibilities: A only, B only, C only, A and B without C, A and C without B, B and C without A, and a combination of A, B, and C.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of authoring data stories with large language models (LLMs), performed at a computing device having one or more processors and memory storing one or more programs configured for execution by the one or more processors, the method comprising:

receiving a first user interaction with one or more portions of a data visualization that is displayed on the computing device;

in response to receiving the first user interaction, generating a first prompt that includes a first plurality of parameters, the first plurality of parameters including:

a first parameter specifying a visualization type of the displayed data visualization;

a second parameter specifying a data array corresponding to data marks of the displayed data visualization; and a third parameter specifying a title of the displayed data visualization;

inputting the first prompt into a large language model (LLM) and obtaining, from the LLM, a text narrative for the one or more portions of the displayed data visualization, the text narrative including one or more sentences;

determining, using a combination of dependency parsing and keyword matching to map phrases in the one or more sentences to attributes and values in the displayed data visualization, that a first sentence of the one or more sentences of the text narrative includes a first keyword that references a first data element in the displayed data visualization;

in accordance with the determination that the first sentence includes the first keyword that references the first data element, generating a first correlation that links the first keyword in the text narrative to the first data element in the displayed data visualization;

after obtaining the text narrative, generating a second prompt in accordance with the text narrative;

inputting the second prompt into the LLM and obtaining, from the LLM, a title for the text narrative;

generating a self-contained story comprising the text narrative and the title;

concurrently displaying the story and the data visualization;

while concurrently displaying the story and the data visualization, receiving a second user interaction with a displayed portion of the text narrative of the story;

in response to receiving the second user interaction:

automatically visually emphasizing an appearance of the displayed portion of the text narrative;

determining that the displayed portion of the text narrative is correlated to a second data element in the displayed data visualization; and in accordance with the determination that the displayed portion of the text narrative is correlated to the second data element:

determining a portion of the displayed data visualization corresponding to the second data element; and visually emphasizing the portion of the displayed data visualization simultaneously with the visually emphasized appearance of the displayed portion of the text narrative.

2. The method of claim 1, wherein:

the first user interaction further includes one or more user-specified annotations on the displayed data visualization; and the first plurality of parameters includes a fourth parameter specifying the one or more user-specified annotations.

3. The method of claim 1, wherein the one or more sentences of the text narrative comprises a plurality of sentences, and the method further comprises:

for each sentence of the plurality of sentences in the text narrative:

determining whether the each sentence of the plurality of sentences includes one or more keywords referencing one or more data elements in the displayed data visualization; and in accordance with the determination that the each sentence of the plurality of sentences includes the one or more keywords referencing the one or more data elements in the displayed data visualization, generating one or more correlations between the one or more keywords and the one or more data elements.

4. The method of claim 1, further comprising:

inputting, into the LLM, a third prompt specifying the text narrative and obtaining, from the LLM, an outline of the text narrative;

updating the story to include the outline between the title and the text narrative; and concurrently displaying the data visualization with the updated story.

5. The method of claim 4, wherein:

the outline comprises a bullet-point summary; and the third prompt includes a fourth parameter specifying a count of bullet points in the summary.

6. The method of claim 5, wherein the fourth parameter is specified by a user.

7. The method of claim 5, wherein the fourth parameter is specified by the computing device.

8. The method of claim 4, further comprising:

after concurrently displaying the data visualization with the updated story, receiving user input modifying the text narrative of the updated story;

in response to receiving the user input:

executing the third prompt in accordance with the modified text narrative;

obtaining, from the LLM, an updated outline corresponding to the modified text narrative; and concurrently displaying the modified text narrative, the updated outline, and the data visualization.

9. The method of claim 4, further comprising:

after concurrently displaying the data visualization with the updated story, receiving user input modifying content of the outline;

in response to receiving the user input:

generating a fourth prompt that includes a second plurality of parameters, the second plurality of parameters including a fifth parameter specifying the content of the outline;

inputting the fourth prompt into the LLM and obtaining, from the LLM, an updated text narrative for the one or more portions of the displayed data visualization;

inputting the second prompt into the LLM and obtaining, from the LLM, an updated title for the updated text narrative;

generating an updated story based on the updated text narrative and the updated title; and concurrently displaying the updated story and the data visualization, including displaying the modified content of the outline between the updated title and the updated text narrative.

10. A computing device, comprising:

one or more processors; and memory coupled to the one or more processors, the memory storing one or more programs configured to be executed by the one or more processors, the one or more programs including instructions for:

receiving a first user interaction with one or more portions of a data visualization that is displayed on the computing device;

in response to receiving the first user interaction, generating a first prompt that includes a first plurality of parameters, the first plurality of parameters including:

a first parameter specifying a visualization type of the displayed data visualization;

a second parameter specifying a data array corresponding to data marks of the displayed data visualization; and a third parameter specifying a title of the displayed data visualization;

inputting the first prompt into a large language model (LLM) and obtaining, from the LLM, a text narrative for the one or more portions of the displayed data visualization, the text narrative including one or more sentences;

determining, using a combination of dependency parsing and keyword matching to map phrases in the one or more sentences to attributes and values in the displayed data visualization, that a first sentence of the one or more sentences of the text narrative includes a first keyword that references a first data element in the displayed data visualization;

in accordance with the determination that the first sentence includes the first keyword that references the first data element, generating a first correlation that links the first keyword in the text narrative to the first data element in the displayed data visualization;

after obtaining the text narrative, generating a second prompt in accordance with the text narrative;

inputting the second prompt into the LLM and obtaining, from the LLM, a title for the text narrative;

generating a self-contained story comprising the text narrative and the title;

concurrently displaying the story and the data visualization;

while concurrently displaying the story and the data visualization, receiving a second user interaction with a displayed portion of the text narrative of the story;

in response to receiving the second user interaction:

automatically visually emphasizing an appearance of the displayed portion of the text narrative;

determining that the displayed portion of the text narrative is correlated to a second data element in the displayed data visualization; and in accordance with the determination that the displayed portion of the text narrative is correlated to the second data element:

determining a portion of the displayed data visualization corresponding to the second data element; and visually emphasizing the portion of the displayed data visualization simultaneously with the visually emphasized appearance of the displayed portion of the text narrative.

11. The computing device of claim 10, wherein:

the first user interaction further includes one or more user-specified annotations on the displayed data visualization; and the first plurality of parameters includes a fourth parameter specifying the one or more user-specified annotations.

12. The computing device of claim 10, wherein the one or more sentences of the text narrative comprises a plurality of sentences, and the one or more programs further include instructions for:

for each sentence of the plurality of sentences in the text narrative:

determining whether the each sentence of the plurality of sentences includes one or more keywords referencing one or more data elements in the displayed data visualization; and in accordance with the determination that the each sentence of the plurality of sentences includes the one or more keywords referencing the one or more data elements in the displayed data visualization, generating one or more correlations between the one or more keywords and the one or more data elements.

13. The computing device of claim 10, wherein the one or more programs further include instructions for:

inputting, into the LLM, a third prompt specifying the text narrative and obtaining, from the LLM, an outline of the text narrative;

updating the story to include the outline between the title and the text narrative; and concurrently displaying the data visualization with the updated story.

14. The computing device of claim 13, wherein:

the outline comprises a bullet-point summary; and the third prompt includes a fourth parameter specifying a count of bullet points in the summary.

15. The computing device of claim 13, wherein the one or more programs further include instructions for:

after concurrently displaying the data visualization with the updated story, receiving user input modifying the text narrative of the updated story;

in response to receiving the user input:

executing the third prompt in accordance with the modified text narrative;

obtaining, from the LLM, an updated outline corresponding to the modified text narrative; and concurrently displaying the modified text narrative, the updated outline, and the data visualization.

16. A non-transitory computer-readable storage medium storing one or more programs, the one or more programs comprising instructions, which when executed by a computing device having one or more processors and memory, cause the computing device to perform operations comprising:

receiving a first user interaction with one or more portions of a data visualization that is displayed on the computing device;

in response to receiving the first user interaction, generating a first prompt that includes a first plurality of parameters, the first plurality of parameters including:

a first parameter specifying a visualization type of the displayed data visualization;

a second parameter specifying a data array corresponding to data marks of the displayed data visualization; and a third parameter specifying a title of the displayed data visualization;

inputting the first prompt into a large language model (LLM) and obtaining, from the LLM, a text narrative for the one or more portions of the displayed data visualization, the text narrative including one or more sentences;

determining, using a combination of dependency parsing and keyword matching to map phrases in the one or more sentences to attributes and values in the displayed data visualization, that a first sentence of the one or more sentences of the text narrative includes a first keyword that references a first data element in the displayed data visualization;

in accordance with the determination that the first sentence includes the first keyword that references the first data element, generating a first correlation that links the first keyword in the text narrative to the first data element in the displayed data visualization;

after obtaining the text narrative, generating a second prompt in accordance with the text narrative;

inputting the second prompt into the LLM and obtaining, from the LLM, a title for the text narrative;

generating a self-contained story comprising the text narrative and the title;

concurrently displaying the story and the data visualization;

while concurrently displaying the story and the data visualization, receiving a second user interaction with a displayed portion of the text narrative of the story;

in response to receiving the second user interaction:

automatically visually emphasizing an appearance of the displayed portion of the text narrative;

determining that the displayed portion of the text narrative is correlated to a second data element in the displayed data visualization; and in accordance with the determination that the displayed portion of the text narrative is correlated to the second data element:

determining a portion of the displayed data visualization corresponding to the second data element; and visually emphasizing the portion of the displayed data visualization simultaneously with the visually emphasized appearance of the displayed portion of the text narrative.

17. The non-transitory computer-readable storage medium of claim 16, wherein the operations further comprise:

inputting, into the LLM, a third prompt specifying the text narrative and obtaining, from the LLM, an outline of the text narrative;

updating the story to include the outline between the title and the text narrative; and concurrently displaying the data visualization with the updated story.

18. The non-transitory computer-readable storage medium of claim 17, wherein:

the outline comprises a bullet-point summary; and the third prompt includes a fourth parameter specifying a count of bullet points in the summary.

19. The non-transitory computer-readable storage medium of claim 18, wherein the fourth parameter is specified by a user.

20. The non-transitory computer-readable storage medium of claim 18, wherein the fourth parameter is specified by the computing device.

* * * * *